United States Patent [19]
Heyne et al.

[11] Patent Number: 6,060,908
[45] Date of Patent: May 9, 2000

[54] DATABUS

[75] Inventors: Patrick Heyne; Dieter Haerle; Thoralf Graetz, all of München, Germany

[73] Assignee: Siemens Aktiengesellschaft, Munich, Germany

[21] Appl. No.: 09/128,806

[22] Filed: Aug. 4, 1998

[30] Foreign Application Priority Data

Aug. 4, 1997 [DE] Germany ............... 197 33 708

[51] Int. Cl.⁷ ................................ H03K 19/00
[52] U.S. Cl. .................... 326/93; 326/56; 326/82
[58] Field of Search ............... 326/82, 86, 47, 326/56, 93

[56] References Cited

U.S. PATENT DOCUMENTS 5,708,374  1/1998  Durham et al. ............... 326/93
5,856,746  1/1999  Petrick ............... 326/17

*Primary Examiner*—Michael Tokar
*Assistant Examiner*—Anh Tran
*Attorney, Agent, or Firm*—Herbert L. Lerner; Laurence A. Greenberg; Werner H. Stemer

[57] ABSTRACT

A databus includes n+1 (n≧2) lines which form n true-only lines and lead from n input blocks to n output blocks. One of the true-only lines as well as a monitoring line are associated with one of the input blocks which is located at a start of the databus and has the longest signal delay time. A NAND gate is connected downstream of the input block at the start of the databus and has an output connected to each output block.

6 Claims, 1 Drawing Sheet

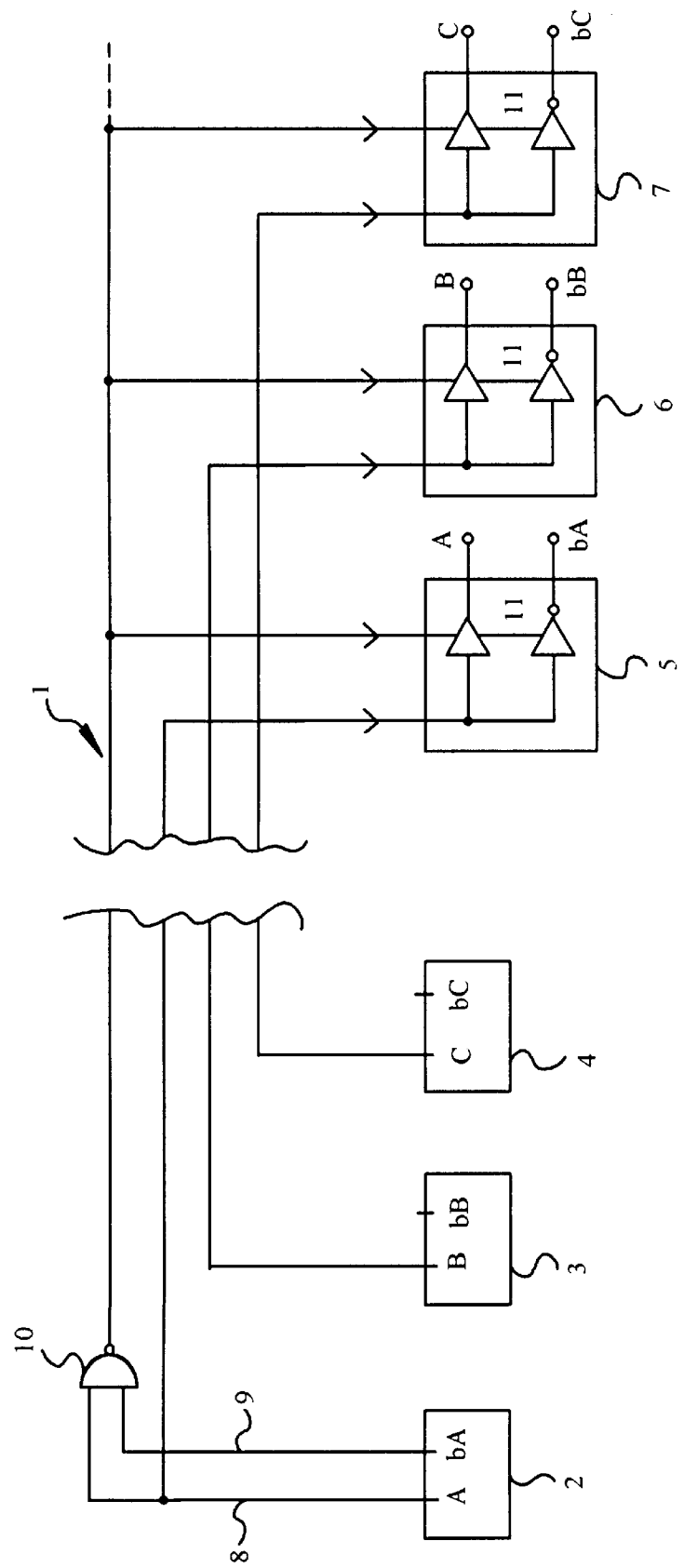

DATABUS

BACKGROUND OF THE INVENTION

Field of the Invention

The invention relates to a databus including n+1 (n≧2) lines which form n true-only lines and a monitoring line (single complement) and lead from n input blocks to n output blocks.

Databuses are often formed, for structural reasons, from "true/complement lines" in which two lines are required for transmitting a data bit between an input block and an output block. Consequently, if required, the data can be further processed differentially after the output block.

In addition, such a configuration of two lines for transmission of a data bit makes it possible to specify for each data bit when that bit on the bus is or is not valid. Specifically, for reliable data transmission, it is important to know when the respective data on the bus are valid, and when they are not.

In order to carry out such a validity check it is possible, for example, to use an unused state of the two mutually complementary data lines in order to indicate that there are no valid data on the bus. That can be done, for example, by assigning a "high" state to the two complementary data lines to indicate that unused state. If one of the two lines then assumes the other, "low" level, it can be deduced therefrom that a valid data bit is present.

In other words, if both lines are at the "high" state, that means that there are no valid data on that line of the bus. However, if the two lines are at different levels, specifically "high" and "low", then it is possible to deduce therefrom that a valid data bit is intended to be transmitted over those lines.

It is, of course, also possible to reverse the potentials, that is to say, for example, to provide a "low" state in order to indicate that there are no valid data on the respective lines.

However, since p-channel MOS transistors produce less current, charging is preferably carried out in the precharging phase, when time is not critical and discharging again is carried out in the switching phase, when time is critical, through n-channel MOS transistors, which are faster than p-channel MOS transistors. The "high" state is thus preferred in order to indicate that there are no data on the respective lines of the bus.

In summary, it can thus be stated that two lines of a databus should be provided, per se, in each case for transmission of a data bit. If the two lines are at the same state, that indicates that a transmitted data bit is invalid, while if the two lines are at different states, that indicates that the transmitted data bit can be regarded as being valid.

In the case of relatively long wiring having a bus between two blocks with two lines for one data bit in each case, a large area is required so that such a procedure does not make sense, for that reason. However, if only one line is provided per data bit, then the information is lacking as to when a respective data bit can or cannot be regarded as being valid.

For that reason, the solution until now has been to provide only one line per bit ("true only") and to produce a monitoring signal in addition. That has the advantage of requiring only n+1 lines instead of two n lines, to transmit n data bits. It is thus important how such a monitoring signal is produced. Specifically, if it is derived from another auxiliary signal, then it is necessary to ensure that the data bits are valid before the monitoring signal, and that can be achieved by the use of delay elements. However, such a procedure necessarily leads to a time window, so that the data transmission becomes longer overall.

SUMMARY OF THE INVENTION

It is accordingly an object of the invention to provide a databus, which overcomes the hereinafore-mentioned disadvantages of the heretofore-known devices of this general type, which has a small area requirement and a simple construction and which allows quick data transmission including information as to when a data bit is valid.

With the foregoing and other objects in view there is provided, in accordance with the invention, a databus, comprising n input blocks having signal delay times, the n input blocks including an input block located at a start of the databus and having the longest signal delay time; n output blocks; n+1 (n≧2) lines forming n true-only lines leading from the n input blocks to the n output blocks; a monitoring line associated with the input block at the start of the databus in addition to one of the true-only lines; and a NAND gate connected downstream of the input block at the start of the databus, the NAND gate having an output connected to each of the output blocks.

In accordance with another feature of the invention, the output blocks each have tri-state inverters, which are controlled by a monitoring signal.

In accordance with a concomitant feature of the invention, there are provided further delay elements, in particular two series-connected inverters, connected downstream of the NAND gate.

In the case of the databus according to the invention, the data outputs of the first input block are thus "true" and "complement", as has already been explained above. The bus itself includes the true-only lines and a monitoring line, the "single-complement" line. For signal delay time reasons, this monitoring line is the complementary line for the data bit that is located at the start of the bus, so as to ensure that the monitoring signal arrives at the receive block after the respective data bits. Thus, in the receive blocks, the monitoring signal supplied from the first input block is in each case fed through the NAND logic operation to each following data bit in addition and is evaluated there. As soon as one of the signals which are fed to the NAND logic operation assumes the "low" state, while the other signal remains at the "high" state, this means that the data bits in the respective input block are valid. The NAND logic operation on the data bits at the start of the bus thus provides the complete monitoring signal at an early stage, with the complexity of only one NAND gate. The NAND logic operation thus takes place with the first data bit in the receive block and passes on the monitoring signal to the other bits in the receive blocks.

An essential feature of the invention is thus the production of the monitoring signal directly from the true/complement data which are present anyway. This is done without any other auxiliary signals, with only a minimal circuit complexity being required, with one NAND gate, and with the signal delay times having to be taken into account by the fact that the NAND gate is positioned after the input block at the start of the bus. There are no time delays resulting from a time window, thus ensuring quick data transmission.

Other features which are considered as characteristic for the invention are set forth in the appended claims.

Although the invention is illustrated and described herein as embodied in a databus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a schematic diagram of a databus according to the invention with input blocks and output blocks.

DESCRIPTION OF THE PREFERRED EMBODIMENTS

Referring now in detail to the single figure of the drawing, there is seen a databus 1 including lines which lead from n input blocks 2, 3, 4 to n output blocks 5, 6, 7. The lines are n+1 (n≧2) lines forming n true-only lines. More than three input blocks and output blocks can, of course, also be provided. The input block 2 has data bits A, is located at a start of the databus 1 and has the longest signal delay time. Two complementary lines 8, 9 connected downstream of the input block 2 lead to a NAND gate 10. If both lines 8, 9 are at a "high" state, this means that there are no valid data on these lines. As soon as one of the lines 8, 9 assumes the other level, that is to say "low", this indicates that a valid data bit is present.

The output of the NAND gate 10 is passed on to the individual output blocks 5, 6, 7 and there to respective tri-state inverters 11. Consequently, data bits "A" and "bA" are additionally fed through the NAND gate 10 to each respective data bit "B" and "C" in each output or receiving block 6, 7, and can thus be evaluated in the output or receiving blocks 6, 7. Therefore, as soon as one of the data bits "A" or "bA" on the respective lines 8, 9 becomes low, this means that the respective data bits "B" and "C" can be regarded as being valid.

It is important that the NAND gate 10 for the data bits "A" and "bA" be placed directly at the output of the data bit "A" from the first input block 2, so that a complete monitoring signal, specifically an output signal from the NAND gate 10, is produced at an early stage on a monitoring line associated with the input block 2. This ensures that the monitoring signal is supplied to all of the output blocks 6, 7.

As can be seen, the databus according to the invention requires only one NAND gate 10, which is assigned to the data bit "A" located at the start of the bus and passes on the monitoring signal for the other bits.

If required, a further delay element, for example two series-connected inverters, can be connected downstream of the NAND gate 10, in order to introduce an additional delay in this way.

We claim:

1. A databus, comprising:

n input blocks having signal delay times, said n input blocks including an input block located at a start of the databus and having the longest signal delay time;

n output blocks;

n+1 (n≧2) lines forming n true-only lines leading from said n input blocks to said n output blocks;

a monitoring line associated with said input block at the start of the databus in addition to one of said true-only lines; and a NAND gate connected downstream of said input block at the start of the databus, said NAND gate having an output connected to each of said output blocks.

2. The databus according to claim 1, wherein said output blocks each have tri-state inverters controlled by a monitoring signal.

3. The databus according to claim 1, including further delay elements connected downstream of said NAND gate.

4. The databus according to claim 2, including further delay elements connected downstream of said NAND gate.

5. The databus according to claim 1, including two series-connected inverters connected downstream of said NAND gate.

6. The databus according to claim 2, including two series-connected inverters, connected downstream of said NAND gate.

* * * * *